Aug. 25, 1964 L. H. SEDARIS 3,146,439
DATA TRANSMITTER
Filed Dec. 28, 1960 3 Sheets-Sheet 1

INVENTOR.
LOUIS H. SEDARIS

BY Charles D. Mears
AGENT 3,146,439

DATA TRANSMITTER

Louis H. Sedaris, Endwell, N.Y., assignor to International Business Machines Corporation, New York, N.Y., a corporation of New York Filed Dec. 28, 1960, Ser. No. 78,959
9 Claims. (Cl. 340—365)

This invention relates to a manual entry data transmitter of the linear or pull-down dial type selectors by which data is transmitted to a data collecting device located at a station remote from the transmitting mechanism.

In the prior art, keyboard transmitting mechanisms wherein data is set up by the manual manipulation of the keys, levers and rotary knobs are well known. Linear dial selector mechanisms have been proposed for use in conjunction with electrical impulse devices, such as telephones. These devices are comprised of a series of coaxial cylinders with the symbols arranged circumferentially thereon, the cylinders being rotated through the appropriate angles corresponding to the symbols in the selection process. Other impulse sending transmitters are actuated by a dial which is rotated through angles determined by holes marked with the appropriate symbols. A rotational motion of the dial through the appropriate angles serves to introduce the data representations into the data collecting system. Such devices are cumbersome and mechanically involved.

The principal object of the invention is to provide a manually actuated data transmitting device of improved construction.

Another object of the invention is to provide a simple, compact and efficient data transmitter by which data is imparted to a remote data storing or collecting mechanism.

Another object of the invention is to provide a data transmitter of the aforesaid character having modular decade construction which permits the number of decades to be varied in accordance with different installation requirements.

A further object of this invention is to provide a linear dialing selector device which reduces the possibility of error in the selection process.

A still further object of this invention is to increase the legibility of the indicia or symbols included in the linear dialing selector device.

Briefly, the manual entry data transmitter comprises a plurality of linear pull-down type dial selector mechanisms each consisting of ten aligned digits consecutively numbered from zero through nine and a blank position. The number of linear slider dial selector mechanisms may be varied to accommodate the installation requirements and particular use for which the manual entry data transmitter is provided. Each slider dial selector mechanism includes switching means and a printed circuit card with circuit connections being established in accordance with the position to which the slider dial selector mechanism is manually set. Each slider dial selector is manually set by inserting a finger in a slot adjacent the desired digit and through a pull-down motion until the finger strikes a stop bar. Each slider dial selector is self-detenting in the depressed position. If an error is made in setting the slider dial selector, a finger can be placed in the reset slot and through a full excursion pull-down motion or until the finger strikes the stop bar wherein the detenting mechanism is released and the slider dial selector assembly will restore to its normal position after which the correct digit can be manually set. After all digits have been set-up on the data transmitter, a read-out can be initiated whereby under program means the printed circuit pattern for each digital order is pulsed to provide a series of electrical impulses representative of the data stored in the data transmitter for transmission over the transmission line connecting the manual entry device with a central data storing medium. Any digital order positions may be locked in a set-up position by the operator in the event the same digital value is to be read out during successive read-out operations. This eliminates repetitive set-up operations by the operator when the same digital value is being read out cyclically. At the conclusion of the read-out operation all of the unlocked slider dial mechanisms are reset to enable a subsequent input of data.

The foregoing and other objects, features and advantages of the invention will be apparent from the following more particular description of preferred embodiments of the invention, as illustrated in the accompanying drawings.

Figure 1:
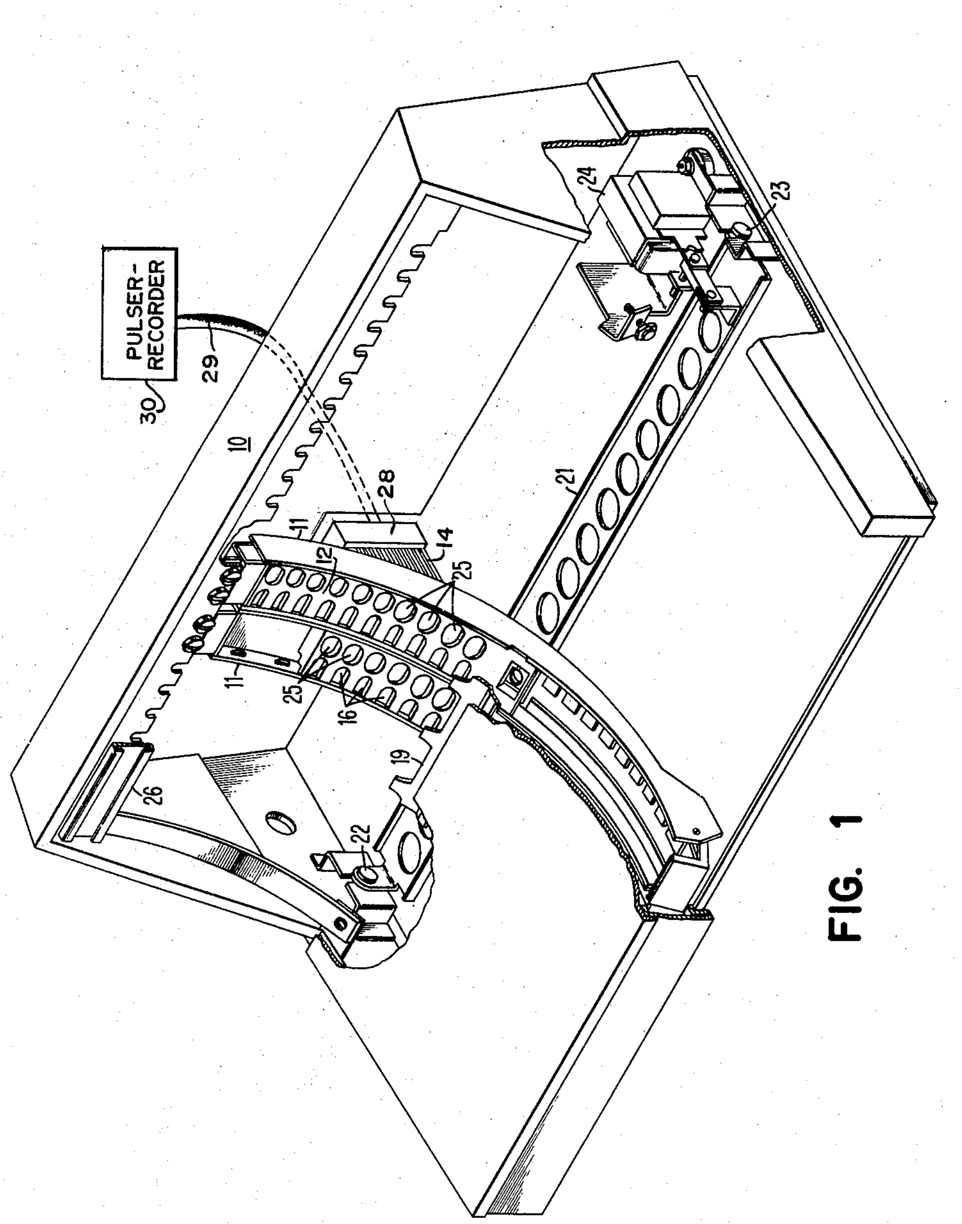
FIG. 1 is a perspective schematic view of a manual entry data transmitter, partially in section, constructed according to a preferred embodiment of the invention, for transmitting data to a remotely located central data storing medium.

In FIG. 1, there is shown a manual entry data transmitter comprising a case 10 capable of housing a plurality of arcuate slidable pull-down type selector assemblies generally indicated at 11 and arranged in juxtaposition mounting. The selector assemblies 11 are mounted to the casing 10 and adapted for removal therefrom as a single unit. The number of selector assembly units 11 may be varied to accommodate the digital order requirements of the installation and the particular use for which the manual entry data transmitter is provided.

Each selector assembly 11 comprises an arcuate and linear slider dial 12 having a switching member 13 (FIG. 2) connected therewith, a printed circuit card 14, and a detenting member 15. Looking at the slider dial 12 from the front, the left side of the slider dial 12 is provided with digit indicating windows 16 (FIG. 1) consecutively numbered from 0 through 9. Adjacent each of the digit indicating windows 16 is an oblong slot 25 for manually actuating the slider dial 12. The slider dial 12 includes a serrated portion **12*a* (FIGS. 2 and 3) adapted for cooperation with the detenting member 15 so that the slider dial 12** will be detented in whatever digital position to which it has been manually moved.

The printed circuit card 14 is permanently secured to the selector assembly 11. The printed circuit card 14 (FIG. 2) comprises a common conductive element **14*a* and a plurality of elements 14*b*, one for the normally restored position and each of the digits 0 through 9. The spring contactor elements 13*a* and 13*b* are adapted to frictionally engage with the conductive elements 14*a* and 14*b* of the printed circuit card 14 for the purpose of making an electrical connection between the common element 14*a* and one of the digit representing elements 14*b* corresponding to the digit manually set up on the selector assembly 11. Each of the printed circuit cards 14 are adapted for wire connection through a terminal 28 to a cable 29 for the purpose of electrically connecting the data transmitter with a remotely located recording medium 30**.

Figure 2:
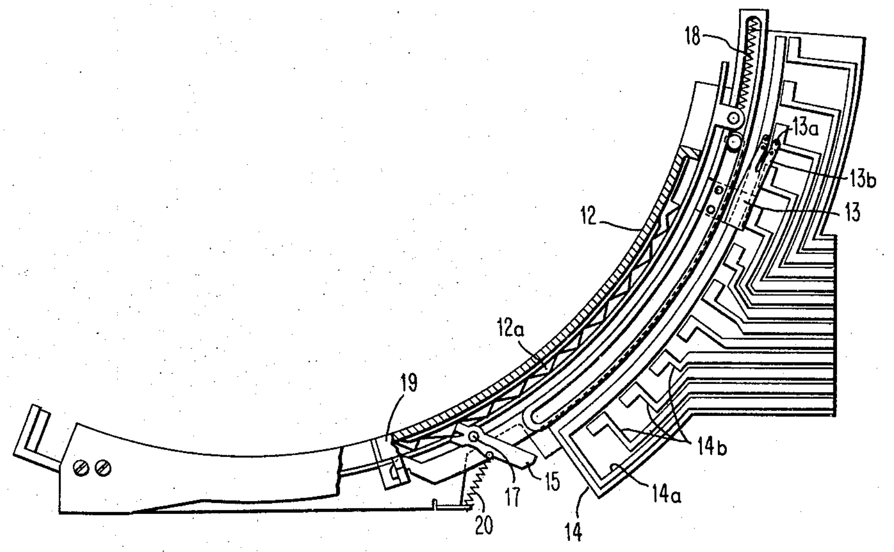
FIG. 2 is a detailed view in side elevation of one of the slider dial selector mechanisms illustrative of the preferred embodiment of the invention.

In operation a numerical value may be manually set-up in the data transmitter by placing a finger in the slot 25 (FIG. 1) adjacent to numeral indicating window 16 of the desired digit for each digital order, one-by-one, and pulling the finger down until the finger strikes the stop bar 19. Referring to FIG. 2, as the slider dial 12 is being set-up the serrated portion 12*a* will cam past the detenting member 15 which pivots on stud 17 and is biased by spring 20. After the slider dial 12 has been set up through a manual pull-down motion, the detenting member 15 serves to detent the slider dial 12 in the position to which it has been manually set.

Figure 3:
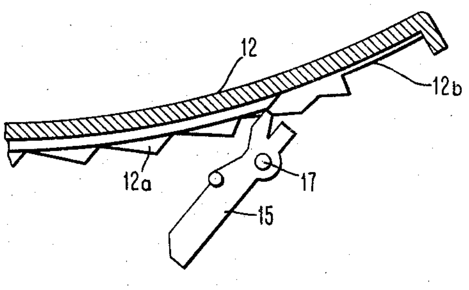
FIG. 3 is a detailed view of the detenting mechanism for the slider dial selector mechanism shown in FIG. 2.

If an error has been made in any particular digital order during the set-up operation, that order may be reset by simply placing a finger in the uppermost slot 25, which is the reset slot, and pulling the slider dial 12 down through a full excursion until the finger strikes the stop bar 19. This action moves the reset slot 12*b* (FIG. 3) of the serrated portion 12*a* into the vicinity of the detenting member 15 whereupon the detenting member 15 will be released from its detenting action and will be free to pivot on stud 17 to an intermediate position under the biasing of spring 20. By removing the finger from the reset slot, the slider dial 12 will restore to its normal uppermost position under the biasing of spring 18 and detenting member 15 will be cammed in the reverse direction during the reset operation, as shown in FIG. 3. When the slider dial 12 has been restored to its uppermost position, a slot at the lower end of the serrated portion 12*a* similar in construction to the slot 12*b* will permit the detenting member 15 to pivot freely on stud 17 to an intermediate position. After the slider dial 12 has been reset another manual set-up operation can be performed to set the correct digit in position.

After all digital orders have been set-up, a read-out can be initiated whereby under program control from a remote location each digital order will be individually and consecutively pulsed to effect a read-out. This causes an electrical pulse from the pulser at 30 connected via cable 29 and terminal 28 to be applied to the common element 14*a* for each digital order selector assembly in consecutive order which in turn causes an electrical signal to occur on the appropriate digit representing element 14*b* which corresponds to the number set up on the selector assembly 11.

In order to simultaneously release the detented slider dials 12 in all of the selector assemblies 11 after data has been transmitted to a central data storing medium and thereby clear the entire data transmitter for subsequent data input, there is provided a transverse rocker lever 21 which extends across all of the detenting members 15. The rocker lever is pivotally mounted on studs 22 and 23 and is motivated in a rocking action through the energization of magnet or solenoid 24. This action serves to move the detenting members 15 out of contact with their respective serrated portions 12*a* whereupon all of the slider dials 12 will restore to their normal position.

Figure 4:
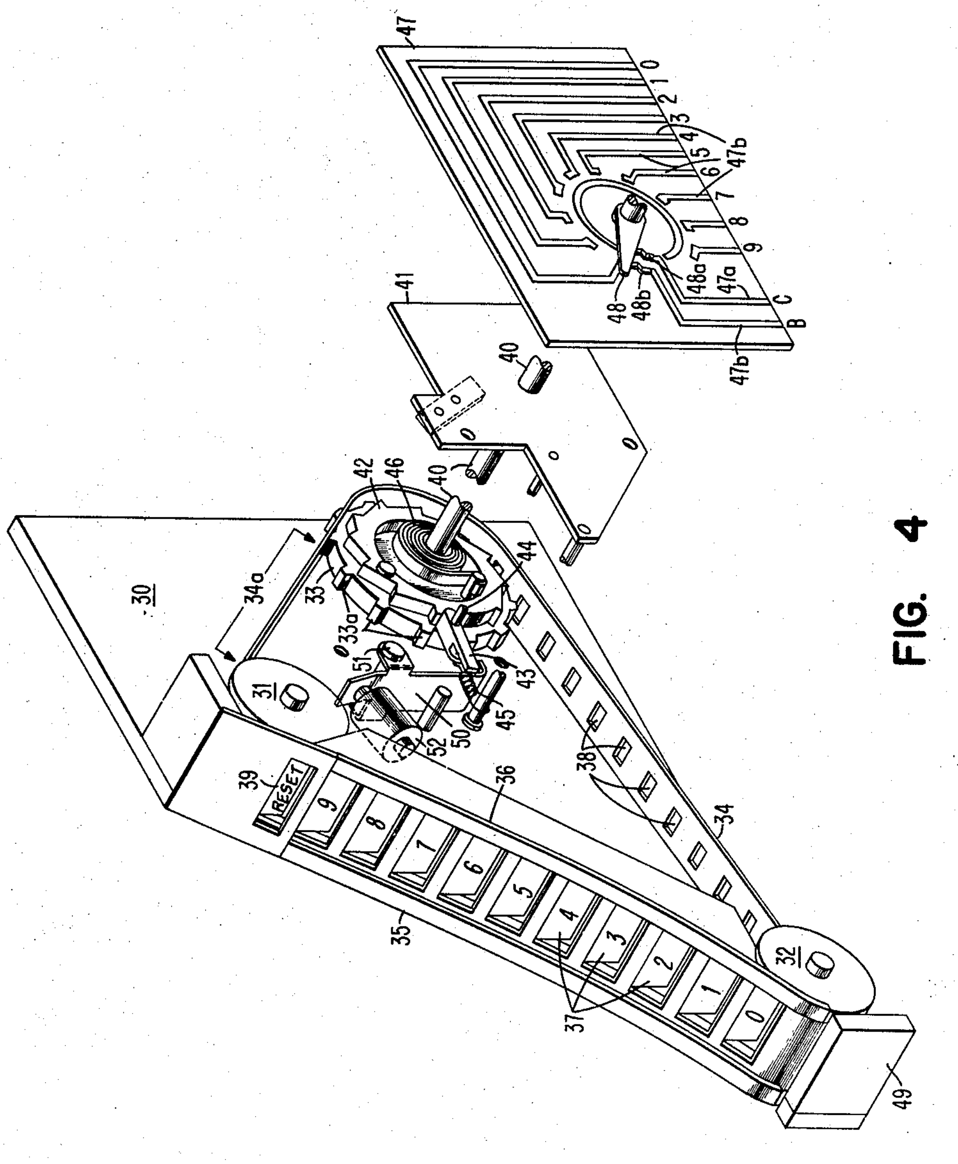
FIG. 4 is a perspective expanded schematic view of an alternative construction for a modular slider dial selector mechanism.

In FIG. 4, there is shown an expanded schematic view in perspective of an alternative construction for a modular slider dial selector mechanism. The selector mechanism includes a base plate 30 on which is mounted two rotatable pulleys 31 and 32 and a rotatable sprocket pulley 33. A flexible tape 34 is supported by pulleys 31 and 32 and sprocket pulley 33. The flexible tape 34 is adapted for slidable movement within the guide members 35 and 36 which are supported by the base plate 30.

The flexible tape 34 has a plurality of rectangular slots 37, one for each of the digits 0 through 9 and reset, and to which are attached appropriate indicator markings. The flexible tape 34 also includes a plurality of evenly spaced sprocket holes 38 adapted to engage with the projections 33*a* on the sprocket pulley 33. Portion 34*a* of the flexible tape 34 is provided with indicator markings which serve to indicate within the window 39 to which position the flexible tape 34 has been moved.

The sprocket pulley 33 is attached to shaft 40 which is rotatably supported by base plate 30 and plate 41. A serrated element 42 is fixed to sprocket pulley 33 and is adapted for coaction with the detenting member 43. Detenting member 43 is pivotally mounted on stud 44 and biased by spring 45. The sprocket pulley 33 includes a rewind spring 46 the function of which will become more fully apparent as the description proceeds.

Plate 41 serves as a support means for the printed circuit card 47. The printed circuit card 47 comprises a common conductive element 47*a* and a plurality of conductive elements 47*b*, one for the normal position and one for each of the digits 0 through 9. An arm 48 is attached to the shaft 40 and has attached thereto the spring contactor elements 48*a* and 48*b* adapted to frictionally engage with the conductive elements 47*a* and 47*b* of the printed circuit card 47 for the purpose of making an electrical connection between the common element 47*a* and one of the digit representing elements 47*b* and corresponding to the value manually set-up on the selector assembly.

In operation a numerical value may be manually set-up in the selector device by placing a finger in the slot 37 for the desired digit and pulling the finger down until it strikes the stop bar 49. As the selector device is being set up the movement of the flexible tape 34 causes the sprocket pulley 33 to be rotated which will serve to introduce a resetting force into the rewind spring 46. Also the rotational movement of the sprocket pulley 33 will cause the serrated element 42 attached thereto to be cammed past the detenting member 43 in the same manner as described above for the preferred embodiment of the invention shown in FIG. 1. After the selector mechanism has been set up through a manual pull-down motion, the detenting member 43 serves to detent the serrated element 42 in the position to which it has been manually set.

If an error has been made during the set-up operation, the selector mechanism may be reset by simply placing a finger in the uppermost slot 37, which is the reset slot, and pulling down until the finger strikes the stop bar 49. This action moves a reset slot on the serrated element 42 into the vicinity of the detenting member 43 whereupon the detenting member 43 will be released from its detenting action and will be free to pivot on stud 44. By removing the finger from the reset slot, the flexible tape 34 will restore to its normal position under the biasing of the rewind spring 46. After the flexible tape 34 has been reset another manual set-up operation can be performed to set the correct digit in position.

After all the digit orders have been set up, a read-out can be initiated whereby under program control from a remote location each digital order will be individually and consecutively pulsed to effect a read-out. This causes an electrical pulse to be applied to the common element 47*a* for each digital order in consecutive order which in turn causes an electrical signal to occur on the appropriate digit representing elements 47*b* which corresponds to the value set-up on the selector assembly.

In order to release the detented selector assembly after the data has been transmitted to a central data storing medium and thereby clear the selector device for a subsequent data input, there is provided a lever 50 which is adapted to engage the detenting member 43. The lever 50 is pivotally mounted on stud 51 and is motivated by the energization of magnet 52. This action serves to move the detenting member 43 out of contact with the serrated element 42 whereupon the flexible tape 34 will restore to its normal position.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data transmitter of the character described comprising a plurality of similar linear multi-character selector assemblies arranged in juxtaposition mounting, each selector assembly including a printed circuit card having a common conductive element and a plurality of character representing conductive elements, a slider element manually movable in a lengthwise direction and having a serrated detenting portion, a plurality of finger receiving slots for enabling the manual movement of the slider elements, a character identifying means associated with each of said finger receiving slots, means connected with said slider element for biasing it to a home position, a detenting member adapted to coact with said serrated detenting portion of said slider element for detenting said slider element in any depressed position, means for releasing said detenting member when such slider element has been fully depressed so as to permit said slider element to return to its normal position, said switching contacts attached to said slider element serving to electrically connect the common conductive element with one of the character representing conductive elements in accordance with the depressed setting of the slider element, terminal means for connecting the conductive element of said printed circuit card with a data transmission cable over which data representing pulses can be imparted to a centrally located data storing medium, and means arranged to actuate the detenting members of all selector assemblies so that slider elements can be simultaneously released for return to the home position.

2. A data transmitter of the character described comprising a plurality of similar linear multi-character selector assemblies arranged in juxtaposition mounting and each adapted for removal from said casing as a single unit, each selector assembly including a printed circuit card having a common conductive element and a plurality of character representing conductive elements, a slider element manually movable in a lengthwise direction, a plurality of finger receiving slots for enabling the manual movement of the slider element, a character identifying means associated with each of said finger receiving slots, spring means connected with said slider element for biasing it to a home position, said slider element having a serrated detenting portion, a spring biased detenting member adapted to coact with said serrated detenting portion of said slider element for detenting said slider element in any depressed position, switching contacts attached to said slider element serving to electrically connect the common conductive element with one of the character representing conductive elements in accordance with the depressed setting of the slider element, and terminal means for connecting the conductive element of said printed circuit card with a data transmission cable over which data representing pulses can be imparted to a centrally located data storing medium.

3. A data transmitter of the character described comprising a casing, a plurality of similar linear multi-character selector assemblies arranged in juxtaposition mounting and each adapted for removal from said casing as a single unit, each selector assembly including a printed circuit card having a common conductive element and a plurality of character representing conductive elements, a linear slider element manually movable in a lengthwise direction, a plurality of finger receiving slots for enabling the manual movement of the slider element, a character identifying means associated with each of said finger receiving slots, spring means connected with said slider element for biasing it to a home position, said slider element having a serrated detenting portion, a spring biased detenting member adapted to coact with said serrated detenting portion of said slider element for detenting said slider element in any depressed position, switching contacts attached to said slider element serving to electrically connect the common conductive element with one of the character representing conductive elements in accordance with the depressed setting of the slider element, terminal means for connecting the conductive element of said printed circuit card with a data transmission cable over which data representing pulses can be imparted to a centrally located data storing medium, and electromagnetically controlled releasing means mounted transversely of the spring biased detenting members of all selector assemblies so that slider elements can be simultaneously released for return to the home position.

4. A data transmitter of the character described comprising a casing, a plurality of similar linear multi-digit selector assemblies arranged in juxtaposition mounting and each adapted for removal from said casing as a single unit, each selector assembly including a printed circuit card having a common conductive element and a plurality of digit representing conductive elements, a linear and arcuate slider element manually movable in a lengthwise direction, a plurality of finger receiving slots for enabling the manual movement of the slider element, a digit identifying means associated with each of said finger receiving slots, spring means connected with said slider element for biasing it to a home position, said slider element having a serrated detenting portion, a spring biased detenting member adapted to coact with the serrated detenting portion of said slider element for detenting said slider element in any depressed position, the serrated detenting portion of said slider element including a section thereof for releasing said spring biased detenting member when such slider element has been fully depressed so as to permit said slider element to return to its normal position, switching contacts attached to said slider element and serving to electrically connect the common conductive element with one of the digit representing conductive elements in accordance with the depressed setting of the slider element, terminal means for connecting the conductive elements of said printed circuit card with a data transmission cable over which data representing pulses can be imparted to a centrally located data storing medium, and electromagnetically controlled releasing means mounted transversely of the spring biased detenting members of all selector assemblies so that all slider elements can be simultaneously released for return to the home position.

5. A data transmitter comprising a plurality of similar multi-character selector assemblies arranged in juxtaposition mounting each adapted for removal from said casing as a single unit, each selector assembly including a printed circuit card having a common conductive element and a plurality of character representing conductive elements, a manually depressable slider element having a serrated detenting portion, a plurality of finger receiving slots for enabling the manual depressing of the slider element, a character identification associated with each of said finger receiving slots, means connected with said slider element for biasing it to a home position, a detenting member adapted to coact with said serrated detenting portion of said slider elements for detenting said slider element in any depressed position, means for releasing said detenting member when said slider element has been fully depressed so as to permit said slider element to return to its home position, switching contacts attached to said slider element serving to electrically connect the common conductive element with one of the character representing conductive elements in accordance with the depressed setting of the slider element, terminal means for connecting the conductive elements on said printed circuit card with a data transmission cable, means to selectively and successively pulse the common conductive elements of each of the selector assemblies in order to provide a train of data representing pulses for transmission over said data transmission cable to a centrally located data storing medium, and means adapted to coact with the detenting members of all selector assemblies so that the slider elements can be simultaneously released for return to the home position.

6. A data transmitter comprising a casing, a plurality of similar multi-digit selector assemblies arranged in juxtaposition mounting each adapted for removal from said casing as a single unit, each selector assembly including a printed circuit card having a common conductive element and a plurality of character representing conductive elements, a manually depressable slider element having a serrated detenting portion, a plurality of finger receiving slots for enabling the manual depression of the slider element, a character identification associated with each of said finger receiving slots, spring means connected with said slider element for biasing it to a home position, a spring biased detenting member adapted to coact with said serrated detenting portion of said slider elements for detenting said slider element in any depressed position, switching contacts attached to said slider element serving to electrically connect the common conductive element with one of the character representing conductive elements in accordance with the depressed setting of the slider element, terminal means for connecting the conductive elements on said printed circuit card with a data transmission cable, means to selectively and successively pulse the common conductive elements of each of the selector assemblies in order to provide a train of data representing pulses for transmission over said data transmission cable to a centrally located data storing medium, and releasing means adapted to coact with the spring biased detenting members of all selector assemblies so that the slider elements can be simultaneously released for return to the home position.

7. A data transmitter comprising a casing, a plurality of similar multi-character selector assemblies arranged in juxtaposition mounting each adapted for removal from said casing as a single unit, each selector assembly including a printed circuit card having a common conductive element and a plurality of character representing conductive elements, a manually depressable slider element having a serrated detenting portion, a plurality of finger receiving slots on each slider element for enabling the manual depressing of the slider element, a character identification associated with each of said finger receiving slots, spring means connected with said slider element for biasing it to a home position, a spring biased detenting member adapted to coact with said serrated detenting portion of said slider elements for detenting said slider element in any depressed position, means for releasing said spring biased detenting member when said slider element has been fully depressed so as to permit said slider element to return to its home position, switching contacts attached to said slider element serving to electrically connect the common conductive element with one of the character representing conductive elements in accordance with the depressed setting of the slider element, terminal means for connecting the conductive elements on said printed circuit card with a data transmission cable, means to selectively and successively pulse the common conductive elements of each of the selector assemblies in order to provide a train of data representing pulses for transmission over said data transmisison cable to a centrally located data storing medium, and controlled releasing means adapted to coact with the spring biased detenting members of all selector assemblies so that the slider elements can be simultaneously released for return to the home position.

8. A data transmitter comprising a casing, a plurality of similar multi-character selector assemblies arranged in juxtaposition mounting and each adapted for removal from said casing as a single unit, each selector assembly including a printed circuit card having a common conductive element and a plurality of character representing conductive elements, a manually depressable slider element having a serrated detenting portion, a plurality of finger receiving slots on each slider element for enabling the manual depressing of the slider element, a character identification associated with each of said finger receiving slots, spring means connected with said slider element for biasing it to a home position, a spring biased detenting member adapted to coact with said serrated detenting portion of said slider elements for detenting said slider element in any depressed position, the serrated detenting portion of said slider element including a section thereof for releasing said spring biased detenting member when said slider element has been fully depressed so as to permit said slider element to return to its home position, switching contacts attached to said slider element serving to electrically connect the common conductive element with one of the character representing conductive elements in accordance with the depressed setting of the slider element, terminal means for connecting the conductive elements on said printed circuit card with a data transmission cable, means to selectively and successively pulse the common conductive elements of each of the selector assemblies in order to provide a train of data representing pulses for transmission over said data transmission cable to a centrally located data storing medium, and electromagnetically controlled releasing means adapted to coact with the spring biased detenting members of all selector assemblies so that the slider elements can be simultaneously released for return to the home position.

9. A data transmitter comprising a casing, a plurality of similar multi-character selector assemblies arranged in juxtaposition mounting and each adapted for removal from said casing as a single unit, each selector assembly including a printed circuit card having a common conductive element and a plurality of character representing conductive elements, a manually depressable slidable belt element, a plurality of revolvable pulleys on which said belt element is movably supported, a detenting element attached to one of said pulleys, a plurality of finger receiving slots on each slidable belt element for enabling the manual depressing of the slidable belt element, a character identification associated with each of said finger receiving slots, spring means associated with one of said pulleys for biasing said belt element to a home position, a spring biased detenting member adapted to coact with said detenting element for detenting said slidable belt element in any depressed position, the detenting element including a section thereof for releasing said spring biased detenting member when said slidable belt element has been fully depressed so as to permit said belt element to return to its home position, switching contacts attached to one of said pulleys serving to electrically connect the common conductive element with one of the character representing conductive elements on said printed circuit card in accordance with the depressed setting of the slidable belt element, terminal means for connecting the conductive elements on said printed circuit card with a data transmission cable, means to selectively and successively pulse the common conductive elements of each of the selector assemblies in order to provide a train of data representing pulses for transmission over said data transmission cable to a centrally located data storing medium, and electromagnetically controlled releasing means adapted to coact with the spring biased detenting members of all selector assemblies so that the slidable belt elements can be simultaneously released for return to the home position.

References Cited in the file of this patent

UNITED STATES PATENTS

| | | |
|---|---|---|
| 2,627,599 | MacKay | Feb. 3, 1953 |
| 2,885,664 | McCue | May 5, 1959 |
| 2,914,759 | Deighton | Nov. 24, 1959 |
| 2,932,733 | Paulson | Apr. 12, 1960 |